United States Patent Office 3,112,350
Patented Nov. 26, 1963

3,112,350
POLYMERIZATION OF OLEFINS USING A SOLID PHOSPHORIC ACID CATALYST
Mitchell S. Bielawski, Mount Prospect, and Julian M. Mavity, Palatine, Ill., assignors to Universal Oil Products Company, Des Plaines, Ill., a corporation of Delaware
No Drawing. Filed June 12, 1961, Ser. No. 116,283
5 Claims. (Cl. 260—683.15)

This application is a continuation-in-part of our co-pending application Serial No. 846,273 filed October 14, 1959, now abandoned.

This invention relates to a process for the conversion of organic compounds and particularly to a process for condensing unsaturated organic compounds. More particularly the invention is concerned with a process for polymerizing olefinic hydrocarbons in the presence of a solid polymerization catalyst.

The recent introduction of automobile engines of high compression ratio and the increasing number of airline flights, both domestic and international, with a corresponding increase in the consumption of aviation gasoline, has led to the need for the utilization of processes in the petroleum refinery industry for the production of extremely high antiknock hydrocarbons as fuels, said fuels being suitable for use in airplane engines and the aforesaid automobile engines having relatively high compression ratios. The isoparaffins and particularly the isooctanes constitute a very desirable fuel for aviation engines due to their high antiknock value, medium boiling range and stability in respect to gummy and resinous deposits which may cause trouble in fuel feed systems. In addition they are also sought after as blending fluids for incerasing the antiknock value of automobile motor fuels which are below grade in this respect. One method for producing isooctanes is to condense a butene or mixture of butenes in the presence of certain acidic catalysts, both liquid and solid in nature, the liquid catalysts including phosphoric acid, fluorosulfonic acid, chlorosulfonic acid, sulfuric acid, etc.; the solid catalysts including aluminum chloride, aluminum bromide, metal oxides, metal sulfides, clays, etc.

Heretofore solid phosphoric acid catalysts which have been used for promoting condensation reactions have been produced by mixing a siliceous adsorbent with an oxygen acid of phosphorus in such proportions that the weight ratio of $P_2O_5$ to siliceous adsorbent of the resultant composite would be about 2. Such a composite was then calcined at a temperature of from about 260° to about 430° C., the calcined catalyst then generally containing about 60 to about 65% by weight of total $P_2O_5$. The catalysts so formed are active condensation catalysts and have a crushing strength generally of from about 10 to about 20 pounds when freshly prepared but have a tendency to deteriorate by softening during use. In addition it has also been found necessary that in order to maintain a high activity of these catalysts it is necessary to add a certain low proportion of water vapor or steam to the charge stock in order to decrease the amount of moisture which is lost by the catalyst during use inasmuch as excess dehydration of the catalysts results in a lowering of catalyst activity which is also accompanied by deposition on the catalyst of heavy hydrocarbonaceous materials having the appearance of tar.

It is a well-known fact that commercial solid phosphoric acid catalysts had very good activities when calcined at a temperature in the neighborhood of about 370° C.; however, these catalysts suffered a very undesirable loss of crushing strength during use. In addition it is also a well-known fact that substantially higher calcination temperatures, e.g., 460° C., improved the crushing strengths to a certain extent but also had a serious drawback in that this calcination temperature impaired the activities of the catalyst. It has now been found, however, that if the phosphoric acid content of a silicophosphoric acid catalyst is raised considerably above the concentration which has heretofore been used in commercial solid phosphoric acid catalysts, that is, a catalyst which is obtained from the calcination of a composite of a diatomaceous earth and a phosphoric acid, said composite containing above 75% by weight of the phosphoric acid prior to calcination, hereinafter referred to as having from 75 to 90% by weight of an oxygen acid of phosphorus, and also, if the calcination temperature is increased so that it is above about 460° C., and preferably from about 540° to about 675° C. (temperatures at which it would generally be assumed heretofore that very serious catalyst deactivation would occur), a silicophosphoric acid catalyst will result having a considerably higher condensation or alkylation activity than that of the previously used commercial catalyst and also will have a greater resistance to deterioration during use because of its unusually high crushing strength.

It is therefore an object of this invention to provide a process for converting unsaturated organic compounds by treating said compounds in the presence of a novel conversion catalyst.

A further object of this invention is to provide a process for polymerizing olefinic hydrocarbons by treating said hydrocarbons in the presence of a novel solid polymerization catalyst.

One embodiment of this invention resides in a process for the polymerization of an unsaturated hydrocarbon which comprises polymerizing said hydrocarbon at polymerization conditions in the presence of a catalyst consisting of a mixture of from about 25% to about 10% by weight of a siliceous adsorbent and from about 75% to about 90% by weight of an oxygen acid of phosphorus having a $P_2O_5$ content of from about 79 to about 85 weight percent, said mixture having been calcined at a temperature in the range of from about 550° to about 900° C., said catalyst being characterized by containing a predominant proportion of crystalline form C, and recovering the resultant polymerized hydrocarbon.

A further embodiment of this invention resides in a process for the polymerization of ethylene which comprises polymerizing said ethylene at a temperature in the range of from about 100° to about 450° C. and at a pressure in the range of from about atmospheric to about 100 atmospheres in the presence of a catalyst consisting of a mixture of from about 25% to about 10% by weight of a siliceous adsorbent and from about 75% to about 90% by weight of an oxygen acid of phosphorus having a $P_2O_5$ content of from about 79 to about 85 weight percent, said mixture having been calcined at a temperature in the range of from about 550° to about 900° C., said catalyst being characterized by containing a predominant proportion of crystalline form C, and recovering the resultant polymerized product.

A specific embodiment of this invention resides in a process for the polymerization of propylene which comprises polymerizing said propylene at a temperature in the range of from about 100° to about 450° C. and at a pressure in the range of from about atmospheric to about 100 atmospheres in the presence of a catalyst consisting of a mixture of from about 25% to about 10% by weight of a diatomaceous earth and from about 75% to about 90% by weight of polyphosphoric acid having a $P_2O_5$ content of from about 79 to about 85 weight percent, said mixture having been calcined at a temperature in the range of from about 550° to about 900° C., said catalyst containing a mole ratio of $P_2O_5$ to $SiO_2$ in the range of from about 1.0 to about 3.0 and being characterized by containing a predominant proportion of crystalline form C, and recovering the resultant polymerized propylene.

A more specific embodiment of the invention resides in a process for the conversion of propylene which comprises condensing said propylene at a temperature in the range of from about 100° to about 450° C. and at a pressure in the range of from about atmospheric to about 100 atmospheres in the presence of a catalyst which has been prepared by admixing from about 25% to about 10% by weight of a diatomaceous earth and from about 75 to about 90% by weight of polyphosphoric acid having a $P_2O_5$ content of from about 79 to about 85 weight percent, heating said mixture to a semi-solid moldable state, shaping said heated mixture and completing the catalyst by calcining said shaped particles at a temperature in the range of from about 550° to about 900° C., said completed catalyst containing a mole ratio of $P_2O_5$ to $SiO_2$ in the range of from about 1.0 to about 3.0 and being characterized by containing a predominant proportion of crystalline form C, and recovering the resultant polymerized propylene.

Other objects and embodiments referring to alternative organic compounds will be found in the following further detailed description of the invention.

Suitable organic compounds which may be condensed in this process are olefin-acting compounds including monoolefins, diolefins and polyolefins. The preferred olefin-acting compounds are olefinic hydrocarbons which comprise monoolefins having one double bond per molecule and polyolefins which have more than one double bond per molecule. Examples of these compounds include monoolefins which are either normally gaseous or normally liquid and include ethylene, propylene, 1-butene, 2-butene, isobutylene, the pentenes, hexenes and higher normally liquid olefins, the latter including various olefin polymers having from about 6 to about 18 carbon atoms per molecule, etc., and diolefins such as 1,3-butadiene, 1,3-pentadiene, 1,3-hexadiene, etc. Cycloolefins such as cyclopentene, cyclohexene, and various alkylcycloolefins such as methylcyclopentene, methylcyclohexene, etc., and polycyclic olefins such as bicyclo[2.2.1]-2-heptene may also be utilized, but generally not under the exact same conditions of operation applying to the non-cyclic olefins.

It is also contemplated within the scope of this invention that the conversion of organic compounds may be effected by utilizing certain substances capable of producing olefinic hydrocarbons, or intermediates thereof under the conditions of operation chosen for the process. Typical olefin producing substances capable of use include alkyl chlorides, alkyl bromides, and alkyl iodides capable of undergoing dehydrohalogenation to form olefinic hydrocarbons and thus containing at least 2 carbon atoms per molecule. Examples of such alkyl halides include ethyl chloride, n-propyl chloride, isopropyl chloride, n-butyl chloride, isobutyl chloride, t-butyl chloride, the amyl chlorides, hexyl chlorides, etc., ethyl bromide, n-propyl bromide, isopropyl bromide, n-butyl bromide, isobutyl bromide, t-butyl bromide, the amyl bromides, hexyl bromides, etc., ethyl iodide, n-propyl iodide, isopropyl iodide, n-butyl iodide, isobutyl iodide, t-butyl iodide, the amyl iodides, hexyl iodides, etc.

This process, using the particular catalyst herein applied, can be successfully applied to and utilized for the conversion of olefinic hydrocarbons when said hydrocarbons are present in minor quantities in gas streams. Thus, in contrast to other processes, the normally gaseous olefinic hydrocarbon need not be purified or concentrated. Such normally gaseous olefinic hydrocarbons appear in minor concentrations in various refinery gas streams, usually diluted with various unreactive gases such as hydrogen, nitrogen, methane, ethane, propane, etc. These gas streams containing minor quantities of olefinic hydrocarbons are obtained in petroleum refineries from various refinery installations including thermal cracking units, catalytic cracking units, thermal reforming units, coking units, polymerization units, etc. Such refinery gas streams have in the past often been burned for fuel value since an economical process for their utilization as alkylating agents or olefin acting compounds has not been available except where concentration of the olefin hydrocarbons has been carried out concurrently therewith. This is particularly true for refinery gas streams containing relatively minor quantities of olefinic hydrocarbons such as ethylene. Thus, it has been possible catalytically to polymerize propylene and/or various butenes in refinery gas streams; however, the off-gases from such processes still contain ethylene. These refinery gas streams containing minor quantities of olefinic hydrocarbons are known as off-gases. In addition to containing minor quantities of olefinic hydrocarbons such as ethylene, propylene and the various butenes, depending upon their source, they contain varying quantities of nitrogen, hydrogen and various normally gaseous olefinic hydrocarbons hereinbefore mentioned. Thus, a refinery off-gas ethylene stream may contain varying quantities of hydrogen, nitrogen, methane and ethane with the ethylene in minor proportions, while a refinery off-gas propylene stream is normally diluted with propane and contains the propylene in minor quantities. Likewise, an off-gas butene stream is normally diluted with butane and contains the butenes in minor quantities. A typical analysis in mole percent for a utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7%; and $C_4$ hydrocarbons, 0.5%. As readily observable the total olefin content of this gas stream is 16.7 mole percent and the ethylene content is even lower, namely 10.3 mole percent. Such gas streams containing olefinic hydrocarbons in minor or dilute quantities may be used as the olefin-acting compounds within the broad scope of the present invention. Furthermore, it is readily apparent that only the olefin content of such gas streams undergoes reaction in the process of this invention, and that the remaining gases free from olefinic hydrocarbons are vented from the process.

The catalyst which is used as a condensation catalyst in the process of this invention comprises a solid phosphoric acid catalyst containing a higher proportion of phosphoric acid to siliceous material than that heretofore employed in producing composites which are later calcined to form finished catalysts, together with the utilization of a calcination temperature higher than that generally used in products such as the solid phosphoric acid catalysts now commonly used in commercial processes. Calcination temperatures used heretofore in producing finished solid phosphoric acid catalysts generally did not exceed about 425° C. except in instances where the calcined composite was given a further steam treatment in which instance the calcination temperature reached a maximum of 455° to 510° C. after which the calcined composite was treated with steam at a temperature of from 230° to about 290° C. In the process of this invention a catalyst calcination temperature of from about 550° to about 900° and preferably a calcination temperature of from about 550° to about 675° C. is utilized. The calcination treatment is also carried out in a much shorter time than that employed heretofore, namely, a time of from about 0.25 to about 8 hours whereas the previously prepared catalysts having a $P_2O_5$ to siliceous material weight ratio of about 2 needed a calcination treatment at a temperature up to about 425° C. for a time of from about 1 to about 60 hours. The catalysts utilized in this process also have higher polymerization activities and higher crushing strengths than those of the catalysts produced heretofore. Such differences in activities and crushing strengths will be shown in more detail in the examples given hereinafter.

The oxygen acids of phosphorous used in the production of the solid phosphoric acid catalysts comprise orthophosphoric acid and other related acids in which the phosphorus has a valence of 5 including pyrophosphoric acid, triphosphoric acid, tetraphosphoric acid, hexametaphosphoric acid as well as mixtures of these phosphoric acids. However, because of greater convenience in the mixing and calcining operations, it is generally preferable to employ the higher phosphoric acids, that is, those having a relatively high ratio of $P_2O_5$ to combined water. It is not intended to infer however that the different oxygen acids of phosphorus, which may be employed in this process, will produce catalysts having identical effects upon any given organic reaction mixture as each of the catalysts produced from different acids and by a slightly varied procedure will have its own characteristic action.

In using orthophosphoric acid as the primary ingredient, different concentrations of the aqueous solution may be employed, for example, acid containing from about 75 to about 100% $H_3PO_4$ or orthophosphoric acid containing some free phosphorus pentoxide may even be used. By this is meant that the ortho acid may contain a definite percentage of the pyro acid which corresponds to the primary phase of dehydration of orthophosphoric acid. Within these concentration ranges, the acids will be liquid of varying viscosities and these liquids are readily mixed with adsorbent materials. In practice it has been found that pyrophosphoric acid corresponding to the formula $H_4P_2O_7$ can be incorporated with siliceous adsorbents at a temperature somewhat above its melting point (namely 61° C.) and that the period of heating which is given to the pyro acid-adsorbent mixtures may be different from that used when the ortho acid is so employed.

Triphosphoric acid which may be represented by the formula $H_5P_3O_{10}$ may also be used as a starting material for preparation of these catalysts. These catalytic compositions may also be prepared from the siliceous materials mentioned herein and a phosphoric acid mixture containing orthophosphoric, pyrophosphoric, triphosphoric and other polyphosphoric acids.

Another acid of phosphorus which may be employed in the manufacture of composite catalysts is tetraphosphoric acid. It has the general formula $H_6P_4O_{13}$ which corresponds to the double oxide formula $3H_2O \cdot 2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperature, the crystals of the tetraphosphoric acid separate from the viscous liquid and it is found that these crystals melt at approximately 34° C. and have a specific gravity of 1.1886 at a temperature of 15° C. However, it is unnecessary to crystallize the tetraphosphoric acid before employing it in the preparation of the solid catalyst inasmuch as the crude tetraphosphoric acid mixture may be incorporated directly with the siliceous adsorbent.

A phosphoric acid mixture which is generally referred to as polyphosphoric acid may also be employed. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79 to about 85% by weight of $P_2O_5$. Such a liquid mixture of phosphoric acids with 79.5% $P_2O_5$ content was found by analysis to contain 24.5% of orthophosphoric acid ($H_3PO_4$), 45.2% of pyrophosphoric acid ($H_4P_2O_7$), 26.0% of triphosphoric acid ($H_5P_3O_{10}$), and 4.3% by weight of unidentified phosphoric acids. Another polyphosphoric acid mixture somewhat more concentrated than the one just referred to and having a $P_2O_5$ content of 84% by weight was found by analysis to contain about 57% by weight of triphosphoric acid ($H_6P_3O_{10}$), 17% by weight of hexametaphosphoric acid (($HPO_3)_6$), 11% of pyrophosphoric acid ($H_4P_2O_7$), 5% by weight of orthophosphoric acid ($H_3PO_4$), and 10% by weight of unidentified phosphoric acids.

The finely divided solid siliceous materials which may be employed as adsorbents or carriers for oxygen acids of phosphorus are divided roughly into two classes. The first class comprises materials of predominantly siliceous character such as artificially prepared porous silica and the diatomaceous earths, including diatomites known under the tradenames as "Celite," "Celite FC," "Dicalite 1," "Dicalite 2," etc., said diatomites being naturally occurring kieselguhrs which are dried by heating at a temperature in the range of from about 400° to about 700° F. and comprise about 90% silica by difference, the remainder being accounted for by various metal oxides and approximately 3.7% ignition loss. The second class of materials which may be employed either alone or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of other members of the class.

In producing the catalyst composites which are utilized in the present invention, an oxygen acid of phosphorus and a solid siliceous material are mixed at a temperature of from about 10° to about 232° C. and preferably at a temperature of from about 95° to about 180° C. to form a composite. Thus satisfactory results have been obtained by heating polyphosphoric acid (82% $P_2O_5$ content) at a temperature of about 170° C. and then mixing this hot acid with diatomaceous earth which has previously been at room temperature. The polyphosphoric acid and diatomaceous earth form a composite in which the weight ratio of phosphorus pentoxide to diatomaceous adsorbent is from about 2.5 to about 7.5. This composite is slightly moist to almost dry in appearance but becomes plastic when subjected to pressure in a hydraulic press-type or auger type extruder by which the composite is formed into pieces that are cut into shaped particles. The resultant catalyst composite while it is still hot is thus extruded through a die preheated to a temperature of about 170° C. The extruded particles of catalyst are then calcined by heating in air, nitrogen, flue gas or some other inert gas at a temperature of from about 550° to about 900° C. and preferably at a temperature of from about 540° to about 675° C. for a time of from about 0.25 to about 8 hours and preferably about 0.5 to about 2 hours to form a substantially granular catalytic material.

In order to further point out the differences which exist between catalysts previously prepared by calcination below 460° C. and containing less than 75% by weight of phosphoric acid, generally in a range of from about 60 to about 65% by weight, as distinguished from catalysts which contain above 75% by weight of phosphoric acid and which have been calcined at a temperature in the range of from about 540° to about 900° C. various samples of the catalysts were analyzed by means of X-ray diffraction. When solid phosphoric acid catalysts are prepared with different mole ratios of $P_2O_5$ to $SiO_2$ and at different calcination temperatures it has been found that various crystalline forms are present in the finished catalyst and it is believed that the activity and crushing strength as well as other properties of these catalysts are dependent upon these crystalline modifications which are present. In this respect, and as will be shown in more detail, the catalysts prepared according to the prior art method, that is, catalysts which contain a relatively low percentage of $P_2O_5$, a relatively low mole ratio of $P_2O_5$ to $SiO_2$ that is, from about 0.53 to about 0.87 moles of $P_2O_5$ to 1.0 mole of $SiO_2$ and which have been calcined at a temperature below about 460° C. and usually at a temperature of about 370° C. contain a crystalline modification which is designated as form "B." Conversely, catalysts which contain a higher mole ratio of $P_2O_5$ to $SiO_2$, that is, from about 1.0 to about 3.0 and preferably from about 1.0 to about 1.5 moles of $P_2O_5$ to 1.0 mole of $SiO_2$ with a correspondingly greater percentage of total $P_2O_5$ present in the catalyst and which have been calcined at a temperature in the range of from about 540° to about 900° C. have been found to possess a predominant proportion of a crystalline modification which is designated as form C. To further illustrate this difference a series of samples was prepared with varying $P_2O_5$–$SiO_2$ mole ratios and various calcination temperatures. The mole ratios of $P_2O_5$–$SiO_2$ varied over a range of from about 0.53 to about 1.30 and calcination temperatures ranging from about 372° to about 900° C. were used. The changes in the crystalline phase of the samples were followed by observing the X-ray diffraction pattern. The samples thus prepared were ground and passed through a 140-mesh screen. In some cases the moisture content of the samples was too high, thus preventing their passage through the screen. These samples were placed in a vacuum desiccator for two days; however, the moisture content was still too high. Therefore, these samples were screened to the smallest obtainable particle size and thereafter scanned by X-ray.

In order to determine the amount of sample present in the X-ray beam it was necessary to add an internal standard. Inasmuch as nickel oxide has an interplanar spacing of 2.08 A. resulting in an intense diffraction line occurring at 43.5° $2\theta$ when using a copper target X-ray tube in the general region of interest, but not directly interfering with the patterns of the sample, it proved to be a suitable internal standard. The Norelco X-ray diffraction equipment which includes a copper target X-ray tube operated at 35 kvp. and 18 mA. a Geiger counter-diffractometer to scan the diffraction patterns and a ratemeter recorder was utilized in these determinations. The samples were packed in the flat diffractometer sample holders. The sample slit system consisted of a 1° divergence slit, 0.020" receiver slit (1° scatter), and a 4° scatter slit. The sample was scanned at 1/2°/minute with the ratemeter at factor 16 and a 4×4 second time constant. By inspecting the various diffraction patterns obtained from the samples the following line diffraction values for the various crystallite forms have been made.

| Form | d, A. | | | ° $2\theta$ | | |
|---|---|---|---|---|---|---|
| B | 3.52 S | 1.31 M.S. | 6.60 M.S. | 25.3 | 72.0 | 12.4 |
| C | 3.67 S | 3.24 M | 3.34 M | 24.3 | 26.7 | 27.5 |
| D | 3.83 M.S. | 3.32 M | 3.50 W | 23.3 | 26.8 | 25.4 |

S—strong. M.S.—moderately strong. M—moderate. W—weak.
d—interplanar spacings, A.
° $2\theta$—angles equivalent to the interplanar spacings when copper radiation is used.

As is apparent from the above figures crystalline form B has a strong interplanar spacing at 3.52 A. and moderately strong spacings at 1.31 and 6.60 A., while crystalline form C has a strong interplanar spacing at 3.67 A. and moderate spacings at 3.24 and 3.34 A.

It is noted from the above table that in certain samples of the catalysts the appearance of new diffraction lines which were not present in pure form C or in pure form B indicates the presence of different crystalline form. Form D as shown above is associated with a moderately strong internal diffraction line appearing at 23.3°.

A comparison of the samples of catalysts using various $P_2O_5$/$SiO_2$ mole ratios at various calcination temperatures is shown in the following table. The term "other forms" as used in said table includes other material either crystalline or amorphous.

*Table A.—X-Ray Diffraction Study of Various Experimental SPA Catalysts*

| Sample | Temp., °C. | $P_2O_5$/$SiO_2$ mol ratio | Qualitative Analysis | | Percent by Wt. | | Other Forms |
|---|---|---|---|---|---|---|---|
| | | | Infrared | X-ray | B | C | |
| 1 | 372 | 0.53 | B | B | 69.4 | 0 | 30.6 |
| 2 | 372 | 0.87 | B+D | B+C+D | 81.5 | 18.5 | |
| 3 | 560 | 1.08 | C+D | C+D | 12.2 | 78.5 | 9.3 |
| 4 | 900 | 1.08 | C+E | C+D | 9.1 | 74.0 | 10.6 |
| 5 | 560 | 1.15 | C+D | C+D | 7.5 | 61.5 | 32 |
| 6 | 560 | 1.23 | C+D | C+D | 8.1 | 70.0 | 21.9 |
| 7 | 560 | 1.30 | C+D | C+D | 3.3 | 92.5 | 4.2 |
| 8 | 900 | 1.30 | C+E | C+E | 10.0 | 65.0 | 25 |

Therefore it is readily apparent from the above table that catalysts which contain a mole ratio of $P_2O_5$ to $SiO_2$ in excess of about 1.08 and which have been calcined at temperatures ranging from about 560° to about 900° C. possess a predominant proportion of crystalline form C and as will be hereinafter shown these catalysts also possess a higher degree of activity when used as polymerization catalysts for the polymerization of unsaturated hydrocarbons than do catalysts which contain a lower mole ratio of $P_2O_5$ to $SiO_2$ and have been calcined at a temperature of around 370° C., the latter catalysts containing a predominant proportion of crystalline form B. It is to be noted that in sample 7 of the above table the weight ratio of crystalline form C to crystalline form B was about 28:1.

The process of this invention utilizing the particular catalyst to convert organic compounds and particularly for polymerizing unsaturated hydrocarbons, or compounds capable of being converted to unsaturated hydrocarbons under the operating conditions of this process, may be effected in any suitable manner and may comprise either a batch or a continuous type operation. For example, when a batch type operation is used, a quantity of the desired catalyst is placed in a suitable condensation apparatus such as a rotating autoclave. The organic compound to be converted is then charged thereto and the apparatus is heated to the desired temperature which may be in the range of from about 100° to about 450° C. In addition the process may also be carried out at pressures ranging from about atmospheric to about 100 atmospheres or more. However, the pressure does not appear to be a critical variable inasmuch as the process may be carried out in either a liquid or vapor phase. Thus, the pressure utilized may be selected purely from the most advantageous pressure based upon economic considerations and upon the stability of the particular reactants which are charged to the process under the necessary processing conditions. At the end of a predetermined residence time the apparatus and contents thereof are allowed to cool to room temperature, any excess pressure present is vented and the desired reaction product comprising the polymerized olefinic hydrocarbon is recovered, separated from the catalyst by conventional means such as filtration, further separated from any unreacted starting materials and recovered by conventional means such as, for example, by fractional distillation, crystallization, etc.

The process of this invention may also be effected in a continuous type operation. The solid phosphoric acid catalyst of the type hereinbefore described is particularly suitable to be used in a fixed bed type of operation. In this type of operation the catalyst is disposed as a fixed bed in a reaction zone which may comprise either an unpacked vessel or coil or which may be lined with an adsorbent packing material such as dehydrated bauxite, fire brick, alumina and the like. The reaction zone is maintained at the proper operating conditions of temperature and pressure while the unsaturated hydrocarbon is continuously charged thereto, the reactant passing over said bed in either an upward or downward flow. In carrying out the process of this invention in a continuous type of operation liquid hourly space velocities (the volume of liquid hydrocarbon charged to the reactor per volume of catalyst per hour) may be varied within a relatively wide range of from about 0.1 to about 30 or more, the preferred range being from about 0.1 to about 20. The desired reaction product is continuously withdrawn from the reaction zone, separated from the reactor effluent and purified by conventional means hereinbefore set forth while the unreacted feed stocks may be recharged to the reaction zone as a portion of the feed material.

Other continuous types of operations which may be used in this process include the compact moving bed type of operation in which the bed of catalyst and the reactant pass either concurrently or countercurrently to each other in the reaction zone, the slurry type process (if the unsaturated olefinic hydrocarbon is in liquid form) in which the catalyst is carried as a slurry in the reactant, and the fluidized type of operation (if the unsaturated hydrocarbon is in gaseous form) in which the catalyst is maintained in a state of turbulence under hindered settling conditions in the reaction zone.

The following examples are given to illustrate the process of the present invention which, however, are not intended to limit the generally broad scope of the present invention in strict accordance therewith.

EXAMPLE I

Diatomaceous earth (32.5 g.) containing 7.8% of volatile matter was added all at once to 120 g. of polyphosphoric acid (84.8% $P_2O_5$ content) at a temperature of 170° C. The initially very soft plastic mass so produced hardened to a material with an extrudable consistency after being maintained at a temperature of 170° C., with stirring every 5 minutes to prevent the composite setting to a hard mass, for a period of 30 minutes. This plastic material was extruded through a 5 mm. die at a temperature of 170° C. by means of a hydraulic press extruder by the application of initial and working loads of 7000 and 5000 pounds, respectively. The extrudate was cut into pieces of 5 mm. lengths by means of a stainless steel spatula. The resultant pills or pellets were first dried at a temperature of 170° C. for 1 hour and then were calcined in a muffle furnace at temperatures of 360° to 660° C. for a time of 1 hour to produce finished catalysts having the activities, apparent bulk densities and crushing strengths given in Table I. The activity of each of these catalysts was determined by placing 10 grams of the catalyst pills and 100 grams of a propane-propylene mixture containing 49.2 mole percent of propylene in a rotatable steel autoclave of 840 cc. capacity which was then operated for 2 hours at a temperature of about 230° C. after which the autoclave and contents were cooled and the percentage of propylene converted was determined. As the apparatus employed in measuring the crushing strength of the pills did not measure crushing strengths greater than 27 pounds, the numerical values of average crushing strengths given in the table are therefore followed by a plus sign in cases in which some or all of the pills had crushing strengths above 27 pounds.

*Table I.—Diatomaceous Earth-Polyphosphoric Acid Catalysts*

| Catalyst No. | Catalyst Starting Materials | Calc. Temp., °C. | Percent Conv. of $C_3H_6$ [a] | A.B.D. g./cc. | Average Crushing Strength, lbs. | |
|---|---|---|---|---|---|---|
| | | | | | Before Test | After Test |
| 1 | 80% PPA [b] and 20% diatomaceous earth [c] (Celite). | 360 | 78.4 | 0.814 | 24.2+ | 24.2+ |
| 2 | | 460 | 87.2 | 0.785 | 27+ | 27+ |
| 3 | | 560 | 92.2 | 0.765 | 27+ | 27+ |
| 4 | | 660 | 89.5 | 0.723 | 25.5+ | 26.4+ |
| 5 | 80% PPA [b] and 20% diatomaceous earth [c] (Dicalite 1). | 510 | 66.1 | 0.824 | 26.8+ | 26.5+ |
| 6 | | 560 | 67.7 | 0.812 | 27+ | 26.3+ |
| 7 | | 610 | 72.0 | 0.809 | 25.8+ | 26.9+ |
| 8 | | 660 | 69.1 | 0.836 | 25.0+ | 26.2 |
| 9 | 80% PPA [b], 20% diatomaceous earth [c] (Dicalite 2). | 360 | 61.4 | 0.867 | 25.8+ | 21.3+ |
| 10 | | 460 | 84.0 | 0.837 | 26.4+ | 26.8+ |
| 11 | | 510 | 87.9 | 0.792 | 27+ | 27+ |
| 12 | | 560 | 89.0 | 0.801 | 27+ | 27+ |

[a] On 5 x 5 mm. cylindrical pills extruded on a laboratory hydraulic press.
[b] Polyphosphoric acid with 84.8% $P_2O_5$ analysis.
[c] Volatile matter free basis.

Three catalyst composites each containing a different sample of diatomaceous earth were prepared and results obtained on these catalyst composites are referred to in Table I. Catalysts prepared from these samples of diatomaceous earth had an initial polyphosphoric acid content of 80% (corresponding to 67.9% total $P_2O_5$), but since weight loss occurs during calcination, final compositions may vary somewhat from these initial compositions calculated from proportions of starting materials. The composites were calcined at temperatures from 360° C. to 660° C. in 50° C. to 100° C. steps. The limited quantity of each catalyst sample and the desirability of determining what was the highest temperature that each composite could tolerate before its activity would start to decline did not permit calcination of all composites at all the temperatures. However, all the composites were calcined at four different temperatures.

From the results obtained on these groups of catalysts calcined at different temperatures, the unexpected high activities and high after use crushing strengths were as shown in Table I. Thus the propylene polymerizing activities reached the unusually high values of 89 and 92% and high after use crushing strengths of 27+ pounds were obtained on catalysts calcined at 560° C. and 660° C. Activity curves which were produced from the results obtained with these groups of catalysts emphasized very effectively the interesting fact that at calcination temperatures above 350° C., differences of 50° to 100° C. on either side of the calcination temperature giving the maximum catalyst activity caused a difference of 6% or less in the unusually high polymerizing activities of these catalysts. In other words, catalysts with such high phosphoric acid content can tolerate a wide range of calcination conditions without losing their activities. However, maximum activities were attained at calcination temperatures in the neighborhood of 560° C. to 610° C., the optimum temperature being dependent upon the particular diatomaceous earth employed. Calcination temperatures above 360° C. had even less effect on the after use crushing strengths as these were all above approximately 26 pounds over the calcination temperature range of 460° C. to 660° C. There was an unmistakable tendency for both the polymerizing activities and the used pill strengths to drop in case of catalysts calcined at temperatures below 460° C.

In addition the catalysts which had been calcined at a temperature in the range of 560° C. to 660° C. contained a predominant proportion of crystalline form C which has been explained in greater detail in a preceding portion of the specification, it being noted that these catalysts exhibited a higher activity in their ability to polymerize propylene than did the others.

EXAMPLE II

A catalyst composite was prepared by mixing 120 g. of polyphosphoric acid (84.8% $P_2O_5$ content) and 33.5 g. of diatomaceous earth (9.6% volatile matter content) according to the procedure described in Example I. The resultant composite was then heated for 30 minutes at a temperature of 170° C. prior to extrusion at that temperature. The extrusion by means of the hydraulic press extruder was initiated with a load of 8000 pounds and was continued with a load of 7000 pounds. The extrudate was cut into 5 x 5 mm. pellets by a stainless steel spatula, it was then dried for one hour at a temperature of 170° C. and divided into four portions which were calcined in a muffle furnace at 560° C. for times of 1, 2, 4 and 8 hours.

A similar catalyst composite was prepared in the same manner and extruded into particles which were also dried for one hour at a temperature of 170° C. after which the pellets were divided into four portions and calcined at a temperature of 360° C. for different lengths of time. The polymerizing activities and crushing strengths of these two groups of catalyst composites calcined at 560° C. and 360° C. for different lengths of time are shown in Table II. The activities of these catalysts were determined on a propane-propylene mixture containing 49.2 mol per cent of propylene using the procedure outlined in Example I.

*Table II.—Effect of Time of Calcination on Activities and Crushing Strengths of Catalysts Produced From Polyphosphoric Acid and Diatomaceous Earth*

| Catalyst No. | Catalyst Starting Materials | Calcination | | Percent Conv. of $C_3H_6$ [a] | A.B.D., g./cc. | Average Crushing Strength, lbs. | |
|---|---|---|---|---|---|---|---|
| | | Temp., °C. | Time, hrs. | | | Before Test | After Test |
| 16 | 80% PPA [b] and 20% diatomaceous earth [c] (Dicalite 2). | 560 | 1 | 75.1 | 0.765 | 27+ | 23.1+ |
| 17 | | 560 | 2 | 78.8 | 0.757 | 27+ | 25.5+ |
| 18 | | 560 | 4 | 78.0 | 0.762 | 26.6+ | 23.2+ |
| 19 | | 560 | 8 | 80.3 | 0.737 | 25.5+ | 20.3+ |
| 20 | 80% PPA [b] and 20% diatomaceous earth [c] (Dicalite 2). | 360 | 1 | 59.6 | 0.812 | 17.9 | 14.4 |
| 21 | | 360 | 2 | 61.3 | 0.781 | 24.1+ | 22.5+ |
| 22 | | 360 | 4 | 61.4 | 0.772 | 22.5+ | 13.6 |
| 23 | | 360 | 8 | 58.6 | 0.788 | 25.5+ | 17.6 |
| 24 | | 360 560 | [d] 1 [d] 1 | 81.5 | 0.738 | 27+ | 19.8 |
| 25 | 70.2% PPA [b] and 29.8% diatomaceous earth [c] (Dicalite 2). | 360 | 1 | 62.8 | 0.738 | 26.9+ | 8.8 |
| 26 | | 460 | 1 | 66.1 | 0.729 | 26.9+ | 7.4 |
| 27 | | 510 | 1 | 64.6 | 0.746 | 26.6+ | 5.5 |
| 28 | | 560 | 1 | 42.2 | 0.710 | 26.3+ | 27+ |

[a] On 5 x 5 mm. cylindrical pills extruded on a laboratory hydraulic press.
[b] Polyphosphoric acid with 84.8% $P_2O_5$ analysis.
[c] Volatile matter free basis.
[d] First calcined one hour at 360° C. followed by one hour calcination at 560° C.

As shown in Table II, calcination at either 360°, 460° or 510° C. of an experimental solid phosphoric acid catalyst (catalysts 25–27) composite prepared from polyphosphoric acid and diatomaceous earth in the proportions commonly employed heretofore in producing commercial polymerization catalysts caused hardly any variation in activity or used pill crushing strength. The activities ranged from 62 to 66% while the used pill crushing strengths varied from 6 to 9 lbs. On the other hand, the calcination at 560° C. seriously lowered the activity (42%) but simultaneously improved the used pill strength (27 lbs.). A comparison of these catalysts with a series previously obtained by similar calcinations of a catalyst composite having an appreciably higher acid content (80% instead of 70%) will conclusively show the superiority of the higher acid content series with respect to both activities and crushing strengths after use.

From the above indicated results it is obvious that the catalyst composites produced from 80% of polyphosphoric acid hereinafter referred to as the 80% acid catalyst and which contain a predominant proportion of crystalline form C are definitely superior to the 70% acid catalysts (commercial polymerization catalysts) which contain a predominant proportion of crystalline form B. The activities of both the 80% acid catalysts and the experimental solid phosphoric acid catalysts start at the same value (approximately 60%) at 360° C. but the activities of the former catalysts continue to rise to 89% at 560° C. calcination, whereas those of the latter catalysts remain about the same (62 to 66%) over the 360° C. to 510° C. range and drop abruptly at 560° C. Moreover, throughout the same temperature range, the used pill strengths of the 80% acid catalysts rise from 22 to 27 lbs. while those of the experimental solid phosphoric acid remain low (6 to 9 lbs.) between 360° C. and 510° C. and rise to the value of the considerably more active 80% acid catalyst first at 560° C. calcination temperature.

The polyphosphoric acid-diatomaceous earth catalyst composite having an 80% acid content showed remarkably constant activities after calcination for various lengths of time (1, 2, 4, and 8 hours) at either 360° C. or 560° C. The activities in the 360° C. series were 59 to 61%, whereas in the 560° C. series the activities were 75 to 80%. On the other hand, the used pill strengths of only the 560° C. series were well behaved. In this series the crushing strengths after use decreased from about 25 to 20 lbs. as the calcination time was increased from two to eight hours. Some of the used pill strengths were good (18 and 22 lbs.) and some rather mediocre (14 lbs.). Apparently a prolonged low temperature calcination of composites with a very high acid content is not a substitute for a short time-high temperature calcination.

There was no diminution in the excellent activities (about 75%) even after an 8 hour calcination. As a matter of fact, the activities actually appeared to improve somewhat (from 75 to 80%) as the calcination time was raised from 1 to 8 hours. Though these crushing strengths after use were all good (above 20 lbs.) they seemed to decrease very slowly as the length of the calcination time was increased.

EXAMPLE III

Catalyst composites similar to those produced in Examples I and II were formed by mixing 82.5% of orthophosphoric acid, $H_3PO_4$, and 17.6% by weight of diatomaceous earth so as to form a phosphoric acid-diatomaceous earth composite having the same $P_2O_5$ to siliceous adsorbent ratio as contained in the catalysts of Examples I and II which were prepared from 80% by weight of polyphosphoric acid. These catalyst composites were then heated at a temperature of 170° C. to produce a plastic mass suitable for extrusion and cutting to form pilled or pelleted catalyst particles. The resultant particles were then calcined at temperatures of 360° C., 460° C., 510°

C., 560° C. for one hour each. Activity test results and crushing strengths of these catalysts were obtained as shown in Table III.

*Table III.—Phosphoric Acid-Diatomaceous Earth Catalysts*

| Catalyst No. | Catalyst Starting Materials | Calcination | | Percent Conv. of C₃H₆ [a] | A.B.D., g./cc. | Average Crushing Strength, lbs. | |
|---|---|---|---|---|---|---|---|
| | | Temp., °C. | Time, hrs. | | | Before Test | After Test |
| 32 | 82.4% H₃PO₄ and 17.6% diatomaceous earth [b] (Dicalite 2). | 360 | 1 | 33.3 | 0.809 | 21.6+ | 21.7+ |
| 33 | | 460 | 1 | 47.7 | 0.734 | 27.0+ | 27+ |
| 34 | | 510 | 1 | 59.1 | 0.743 | 27.0+ | 27+ |
| 35 | | 560 | 1 | 70.9 | 0.705 | 27.0+ | 27+ |

[a] On 5 x 5 mm. cylindrical pills extruded on a laboratory hydraulic press.
[b] Volatile matter free basis.

Comparison of the activities and crushing strengths of the catalyst referred to in Table III with similar catalysts prepared from polyphosphoric acid and diatomaceous earth (catalysts 9–12 of Table I) indicates that orthophosphoric acid does not appear to be equivalent as a starting material for producing structurally strong and highly active catalysts. Though at all calcination temperatures (360°, 460°, 510° and 560° C.) the excellent used pill strengths of any corresponding pair of catalysts in the two series are practically identical, the activities of the catalysts derived from the 85% orthophosphoric acid are definitely below the superior activities of the corresponding catalysts produced from polyphosphoric acid. Some correlation seems to exist between the differences in the activities of any corresponding pair of catalysts in the two series namely, pairs of catalysts produced from the different acids with calcination at the same temperature and the differences in their residual amounts of water (that is the water contained in the catalyst composition after final calcination).

EXAMPLE IV

Solid phosphoric acid catalysts prepared from 80% of polyphosphoric acid (84.8% P₂O₅ content) and 20% of diatomaceous earth (Dicalite) which contained a predominant proportion of crystalline form C were also subjected to laboratory accelerated life tests which determined the activity as measured by percent polymerization of propylene and measured the operative catalyst life by the lengths of time required to develop a certain pressure drop throughout the catalyst layer, this pressure drop being measured by a suitable pressure differential instrument and indicated in Table IV as a difference of 100 inches of water. This method involved use of a fixed bed of catalyst of 20–40 mesh particle size contained in a catalyst tube of 0.212 inch internal diameter surrounded by a temperature control jacket containing ethylbenzene maintained at a temperature of 260° C. Through this catalyst tube, a propane-propylene mixture (41.8 mole percent C₃H₆) was passed at an hourly liquid space velocity of 30 and at a pressure of 1200 pounds per square inch gage. The results obtained in these runs and comparative results obtained on a regular solid phosphoric acid catalyst which contains a predominant proportion of crystalline form B are given in Table IV.

*Table IV.—Life Tests on Commercial Solid Phosphoric Acid Catalysts and Catalysts Prepared From 80% Polyphosphoric Acid and 20% Diatomaceous Earth*

| Catalyst Description | Calcination | | Autoclave Tests [a] | | | Life Tests [b] | |
|---|---|---|---|---|---|---|---|
| | °C. | Hours | Percent Conv. of C₃H₆ | Crushing Strength, lbs. | | To 100" Hrs. on Stream | H₂O Pressure Gal. Polymer/lb. cat. |
| | | | | Original | After Test | | |
| Comm. Solid phosphoric acid from Dicalite | | | 66 | 10.9 | 6.2 | 88 | 50 |
| | 360 | 1 | 56.7 | 26.4 | 26.6+ | 5.8 | 3.9 |
| 80% PPA + 20% Diatomaceous earth (Dicalite 2). | 360 | 1 | | | | 4.2 | 3.1 |
| | 460 | 1 | 66.0 | 27+ | 26.3+ | 74 | 40 |
| | 560 | 1 | 84.0 | 27+ | 27+ | 127 | 52 |
| | 560 | 1 | 71.6 | 27+ | 27+ | | |
| | 660 | 1 | 82.0 | 27+ | 27+ | 194 | 56 |

[a] 10 g. pills, 100 g. PP feed (approx. 50% C₃H₆), 2 hrs. at 230° C. in 850 cc. rotating autoclave.
[b] 20–40 mesh catalyst, 0.212 inch I.D. tube, 260° C. jacket temp. 30 LHSV, PP feed (41.8% mol % C₃H₆). 1200 p.s.i.g.

From the above indicated results it is noted that the high acid content diatomaceous earth-polyphosphoric acid type catalyst shows the following desirable characteristics: (1) It exhibits remarkable stability toward high temperatures (as high as 560°–660° C.). (2) It develops less pressure differential (560°–660° C. calcined samples) than did commercial solid phosphoric acid. (3) Production of polymers (gallons per pound of catalyst) appears comparable to that obtained with regular solid phosphoric acid catalyst.

The results as evidenced by the above examples demonstrate the superiority of the improved catalyst prepared from 80% polyphosphoric acid and 20% diatomaceous earth (characterized by containing a predominant proportion of crystalline form C) as compared to the regular catalyst prepared from 70% polyphosphoric acid and 30% diatomaceous earth (characterized by containing a predominant proportion of crystalline form B). It is noted in Table II that in the latter when calcination temperature was increased, the crushing strength after use increased, but the activity of the catalyst, as illustrated by the percent of propylene conversion, was decreased and finally reached a low value of 42.2% on a catalyst which had been calcined for one hour at a temperature of 560° C. In contradistinction to this, it is noted in Table I that the catalysts which contained the high percentage of polyphosphoric acid, which were calcined at a temperature of 560° C. for one hour and which were characterized by containing a predominant proportion of crystalline form C exhibited a markedly superior activity, as illustrated by an 89% propylene conversion, and in addition, maintained suitable after-use crushing strength.

We claim as our invention:

1. A polymerization process which comprises contacting an olefinic hydrocarbon at polymerizing conditions with a catalyst consisting essentially of a calcined mixture of about 20% by weight of a diatomaceous earth and about 80% by weight of a polyphosphoric acid having a P₂O₅ content of from about 79 to about 85 weight percent, said mixture having been calcined at a temperature of from about 560° to about 900° C. and said catalyst having a mole ratio of P₂O₅ to SiO₂ in excess of about 1.08 and a weight ratio of crystalline form C to crystalline form B of about 28:1.

2. The polymerization process of claim 1 further characterized in that the olefin is contacted with the catalyst at a temperature in the range of from about 100° to about 450° C. and at a pressure in the range of from about atmospheric to about 100 atmospheres.

3. The process of claim 2 further characterized in that said olefin is ethylene.

4. The process of claim 2 further characterized in that said olefin is propylene.

5. The process of claim 2 further characterized in that said olefin is butylene.

References Cited in the file of this patent

UNITED STATES PATENTS

| | | |
|---|---|---|
| 2,642,402 | Corner et al. | June 16, 1953 |
| 2,694,048 | Bielawski et al. | Nov. 9, 1954 |
| 2,694,686 | Reeves et al. | Nov. 16, 1954 |
| 2,778,804 | Corner et al. | Jan. 22, 1957 |
| 2,833,727 | Mavity | May 6, 1958 |
| 2,833,728 | Bielawski | May 6, 1958 |
| 2,913,506 | Engel | Nov. 17, 1959 |